Figure 1:
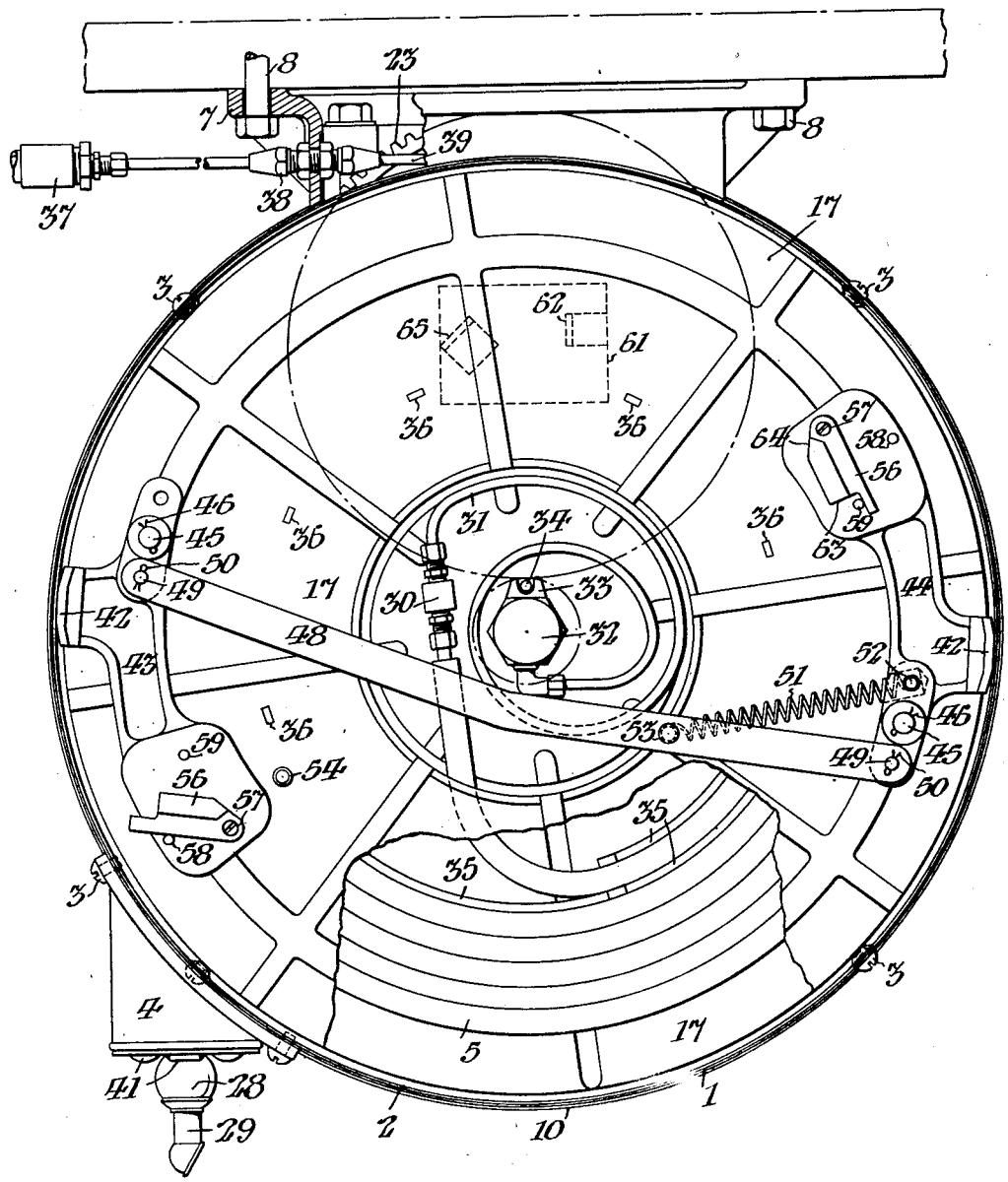

Feb. 20, 1934.      G. V. BARR      1,948,158
HOSE REEL
Filed Dec. 22, 1931     2 Sheets-Sheet 1

INVENTOR:
GILES V. BARR,
BY
Attorney.

Feb. 20, 1934. G. V. BARR 1,948,158
HOSE REEL
Filed Dec. 22, 1931 2 Sheets-Sheet 2
FIG. II.
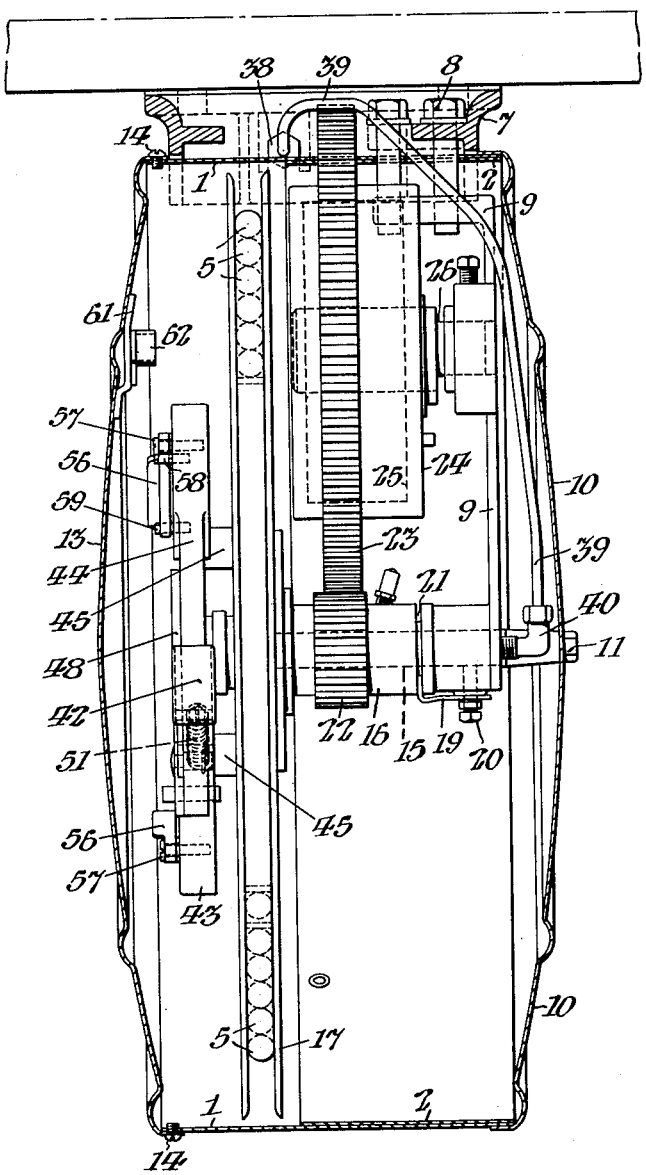
FIG. III.
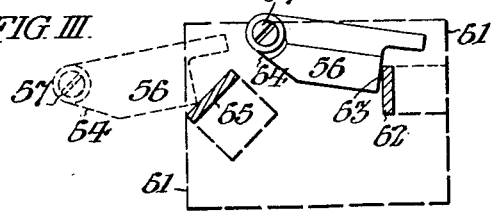
INVENTOR:
GILES V. BARR,
BY Patented Feb. 20, 1934

1,948,158

UNITED STATES PATENT OFFICE 1,948,158

HOSE REEL

Giles V. Barr, Conshohocken, Pa., assignor to Service Station Equipment Company, Conshohocken, Pa., a corporation of Delaware Application December 22, 1931
Serial No. 582,513

5 Claims. (Cl. 242—86)

My invention may be advantageously employed in apparatus for dispensing fluids to motor vehicles, and particularly for dispensation of compressed air for inflation of vehicle tires through a hose which is normally retracted and wound on a reel by spring means appurtenant to the reel, but which is adapted to be withdrawn from the reel more or less during each dispensing operation. Ordinarily, such reels are so constructed and arranged that it is necessary for the operator to continually maintain the hose under tension to hold it in any position to which it may be withdrawn from the reel; because, the instant the hose is released, the spring means aforesaid turns the reel to rewind the hose upon it. Consequently, if the operator accidentally lets go of the hose, it is immediately retracted upon the reel and it is necessary for the operator to again lay hold of it and withdraw it manually to the extent desired and there hold it. The necessity for such constant attention and manipulation of the hose on the part of the operator is particularly undesirable in the inflation of vehicle tires, for the operator must also attend to other matters, for instance, remove and replace the caps upon the valves of such tires, and the manipulation of a pressure gage to determine the proper pressure of inflation.

Therefore, it is the principal object and effect of my invention to provide a hose reel of the spring pressed type aforesaid with means whereby the operator may be relieved of the necessity for continually maintaining the hose under tension; automatically operative clutch means being provided to temporarily detain the hose in any position to which it may be withdrawn by the operator; such clutch means being readily releasable at the will of the operator by means of tension on the hose.

The form of my invention hereinafter described is adapted for suspension from a ceiling or side wall and for erection upon a floor or pavement. That apparatus includes an outer casing, which is principally drum-shaped and which is adapted to inclose the hose reel and its appurtenant spring mechanism; which casing is formed of two cylindrical sections connected in coaxial relation, one of said sections being rigidly connected with a base which may be presented downwardly, upwardly, or laterally at either side of the casing axis; the other section of the casing being rotatably adjustable on the section which is fixed on said base; said rotatable casing section carrying the outlet for the hose; so that the hose outlet may be presented in any desired direction, in accordance with the location of said base.

The general construction and arrangement of the reel which I have chosen for illustration, other than the clutch means above contemplated, is the subject matter of application Serial No. 524,870 filed March 24, 1931, by Joseph C. Woodford for Letters Patent of the United States for Improvement in fluid dispensing apparatus.

My invention includes the various novel features of construction and arrangement hereinafter more definitely specified.

In said drawings; Fig. I is an axial end elevation of an embodiment of my invention, disposed as a ceiling reel, with the hose outlet directed downwardly, but with the axial end cover of the rotary section of the casing removed to show the interior construction and arrangement.

Fig. II is a central vertical sectional view of the casing shown in Fig. I, taken on the line II, II, in Fig. I but with the mechanism within the casing shown in elevation.

Fig. III is a partly sectional elevation of the stationary clutch plate which, as shown in Fig. II, is attached to the casing cover which is omitted from Fig. I, and shows the cooperation with that plate of one of the clutch pawls, which is carried by the hose reel, as shown in Fig. I.

In said figures; the reel casing comprises two cylindrical sections 1 and 2; preferably formed of primarily flat strips of sheet metal bent to the cylindrical form shown. Said section 1 is rotatably adjustable upon the section 2, to which it is secured by a circular series of four screws 3, shown in Fig. I; so that said section 1, which carries the hose outlet housing 4, may be secured to the section 2 in any one of four positions in accordance with the direction in which it is desired to withdraw the hose 5. Said casing section 2 is rigidly connected with the base plate 7, conveniently by the bolts 8 extending through it into engagement with the bracket 9 to which the removable circular cover 10 of said casing section 2 is detachably secured by two laterally spaced tap screws 11, one of which is shown in Fig. II. Said casing section 1 is provided with a similar removable circular cover 13, but it is secured by a circular series of screws 14, two of which are indicated in Fig. II.

Said bracket 9 carries the stationary stud shaft 15, in coaxial relation with said casing extending in the hub 16 of the hose reel 17 and supporting the latter for rotation. Said shaft 15 is tubular and serves as an air conduit as hereinafter described. Accidental axial displacement of said hub and reel is prevented by the clip 19, which is detachably secured on said bracket 9 by the screw 20 and has its inner end bent into engagement with the circumferential slot 21 in said reel hub 16.

Said reel hub 16 has the circular series of gear teeth 22 thereon in mesh with the gear 23 of the drum 24 which contains the spirally wound spring 25, the outer end of which is secured to said drum 24 and the inner end of which is secured to the stationary stud shaft 26 upon which said drum is journaled.

Said reel 17 carries said hose 5 which is normally wrapped thereon, as shown in Fig. I, with the resilient, preferably rubber, buffer ring 28, which encircles said hose, in contact with the housing 4 which serves as a stop for it. Said ring 28 bears against the casing 29 of a spring pressed check valve of the usual so-called "chuck" form used for coupling the hose in airtight relation with the valve of a vehicle tire to inflate the latter. As shown in Fig. I, the inner end of said hose 5 is connected by the screw coupling 30 with the flexible metal tube 31 having at its inner end the coupling 32 which is rotatable with respect to said stationary shaft 15 but is maintained in airtight relation therewith, by any suitable means. Said coupling 32 has its bifurcated flange 33 engaging the stud 34 projecting rigidly from said reel 17, as shown in Fig. I; so that said coupling is turned by said reel.

As indicated in Fig. I; the opposite side plates of said reel 17 are connected by the metal partition band 35 which extends evolutely with respect to the axis of said reel and has lugs 36 riveted through said plates to rigidly connect them and serve as a support for the coil of hose, the inner end of which is held between evolutely overlapped ends of said band 35, as shown in Fig. I.

Compressed air, from any suitable source, such as a compressor pump, is supplied to said hose 5 through the conduit 37 shown in Fig. I, which is connected through suitable couplings 38 fixed in the side of said base 7, with the metallic conduit 39, which, as shown in Fig. II, extends from said coupling 38 to the elbow 40 which is held stationary in said bracket 9 and leads into said hollow shaft 15; so that the air from said supply conduit 37 is directed through said shaft and the coupling 32 at the inner end of said shaft 15 to said hose 5.

To dispense air through said hose 5, the operator grasps the buffer ring 28 and valve casing 29 and withdraws the hose to the desired position. Withdrawal of the hose through the housing 4 is facilitated by providing the latter with a circular series of four rollers 41, indicated in Fig. I. Said rollers may be constructed and arranged as set forth in application Serial No. 524,871 filed March 24, 1931, by Charles M. Tursky for Letters Patent of the United States for Improvement in fluid dispensing apparatus. Such withdrawal of the hose 5 through the casing housing 4 of course turns the reel 17 and thereby winds the spring 25 in the drum 24 so that said spring will retract said hose to the position shown in Fig. I, when the operator releases it. It is the practice of operators to let go of such hose after each dispensing operation and permit it to be automatically rewound by the action of the spring which rotates the reel with increasing speed, until its rotary movement is stopped by the impact upon the reel casing housing 4 of the buffer ring 28. The valve fitting 29 and the hose are thus subjected to severe stresses which are quickly destructive of the joint between them. Therefore, said reel is provided with brake mechanism by which its speed of rotation may be checked to prevent such destructive stresses upon the hose and its appurtenances. Such brake mechanism includes the centrifugally operative brake shoes 42 which are adapted to frictionally engage the inner surface of the casing section 1 when the reel 17 is turning, in either direction, in excess of a certain speed which is predetermined by the arrangement of the parts hereinafter described. Said brake shoes are carried by respective levers 43 and 44 which are respectively fulcrumed on the studs 45 upon which they are held by cotter pins 46, as indicated in Fig. I. Said levers 43 and 44 are coupled by the link 48 which is pivotally connected at opposite ends to respective studs 49 projecting from said levers 43 and 44, upon which said link is held by cotter pins 50. Said levers 43 and 44 are both continually stressed to withdraw said brake shoes 42 from braking contact with the inner surface of the casing section 1, by the single tension spring 51 which, as shown in Fig. I, is connected at one end with the pin 52 in the brake lever 44, and at the other end with the stud 53 on said link 48. Consequently, when said levers are relieved of the centrifugal effect of the rotation of said reel 17 in either direction, they are retracted to the limit determined by the location of the stud 54 shown in Fig. I which stops the inward movement of the lever 43.

However, each of said levers 43 and 44 has its free end enlarged to afford considerable weight thereof for centrifugal movement incident to rotation of the reel and such as to bring said brake shoes 42 into frictional engagement with the casing member 1 sufficient to check and limit the speed of rotation of said reel 17 both counterclockwise, when it is turned by withdrawal of the hose by the operator, and clockwise when the hose is released and the reel is turned by said spring 25; when the reel attains a speed predetermined by the stress of said spring 51 and with the effect of preventing destructive stresses upon the apparatus such as above contemplated.

Fig. I shows the braking position of said levers which is maintained by the centrifugal effect of rotation of said reel, consequent upon the release of the hose fitting 29 by the operator until the buffer ring 28 is seated upon the buffer rollers 41 shown in Fig. I.

As shown in Fig. I; said brake levers 43 and 44 carry at their free ends similar clutch pawls 56 which are pivoted on respective screw studs 57 fixed in said levers. Said pawls are free to oscillate on said studs but their outward movement is limited by studs 58 and their inward movement limited by studs 59, fixed in said levers. The arrangement is such that said centrifugal effect upon the brake levers also throws said pawls 56 both outward to the position in which the one is shown at the left of Fig. I, but as the reel comes to rest and they are relieved of such centrifugal effect, they automatically gravitate to the inward limit of their range of movement, as the one at the right of Fig. I is shown.

Said clutch pawls 56 are both designed and adapted to cooperate with the single clutch plate 61, which is rigidly connected with the cover 13 of the casing section 1, as shown in Fig. II, in the position indicated in dotted lines in Fig. I. Said plate 61 has, rigidly projecting therefrom, the inwardly extending reel stop flange 62 which, as indicated in Fig. I is in substantially radial relation with the axis of the reel and, as indicated in Fig. III, is adapted to be encountered by the free end 63 of each of said pawls 56 when the latter are presented thereto in the position shown in full lines in Fig. III. It may be observed, with reference to Fig. I, that if the operator pulls the hose 5 through the casing housing 4, the pawl 56 shown at the right of said figure will have its inclined surface 64 brought against said stop flange 62 so that the pawl is uplifted and rides thereover and falls into the position shown in full lines in Fig. III so that if the operator then releases said hose, the latter is held in the position to which it has been withdrawn. If the operator continues to withdraw said hose, the pawl 56 is carried counterclockwise, by the turning movement of said reel, from the stopped position shown in full lines in Fig. III to the idle position shown in dotted lines in said figure. The pawl tripping flange 65 on said plate 61 projects inwardly to the same extent as the stop flange 62 on said plate, and is then encountered by the inclined portion 64 of the pawl which serves to uplift said pawl to pass freely over said tripping flange 65 in counterclockwise direction. Moreover, if the operator suddenly releases the hose so that the reel is moved in a counterclockwise direction by said spring 25, each pawl 56 is thrown outward by riding over the inclined outer surface of said tripping flange 65 so that, when the speed of movement of the reel is such as to afford a sufficient centrifugal effect to retard the gravitation of said pawls 56 in their passage between the tripping flange 65 and the stop flange 62, they are thus tripped from contact with said stopping flange and the hose rewound automatically upon the reel by the action of the spring, and stopped only when the buffer ring 28 comes into contact with the buffer rollers 41. However, if the operator releases said hose 5 slowly, the pawl 56 which is pushed radially outward by sliding over the tripping flange 65, as indicated in dotted lines in Fig. III, is permitted to gravitate into engagement with the stop flange 62 in the position shown in full lines in said figure. Consequently, the operator may withdraw the hose 5 from the reel to any desired extent and cause it to be temporarily automatically detained in any desired withdrawn position by the cooperation of said clutch pawls 56 with said clutch plate 61 and thus relieve the operator of the necessity for continually maintaining the hose under tension to hold it in any desired withdrawn position. Moreover, the operator may instantly release either of the clutch pawls 56 from its engagement with the clutch plate stop flange 62 by pulling the hose to turn the reel to carry the pawl from the position shown in full lines to that shown in dotted lines in Fig. III, and then suddenly releasing the hose, with the effect that said pawl is tripped to pass over the stop flange 62 without engaging it and thus permits the hose to be automatically rewound by the spring 25 to any desired extent, which the operator may limit by sufficient tension on the hose to slow down the movement of the reel and permit either pawl 56 to engage said stop flange 62.

Although I have found it convenient to arrange the stationary clutch member on the removable cover of the casing to cooperate with the movable clutch members which are carried by brake levers as above described; it is to be understood that both the stationary and movable members of the clutch device may be otherwise located and operated; the essential features of my invention being the combination with a spring stressed hose reel, of means for sustaining that stress without movement of the hose in any desired position of withdrawal of the hose; such means being releasable by tension on the hose.

Therefore, I do not desire to limit myself to the precise details of construction and arrangement herein set forth, as it is obvious that various modifications may be made therein without departing from the essential features of my invention, as defined in the appended claims.

I claim:

1. The combination with a hose reel; of a hose having one end connected to said reel; a spring for turning said reel in one direction to wind the hose thereon; clutch means for detachably detaining said reel with the hose in a position to which it may be withdrawn; said clutch means being releasable by tension upon the hose; a casing for the reel and its appurtenances; and a brake lever carried by the reel adapted to frictionally engage said casing when the movement of said reel exceeds a predetermined speed; said brake lever carrying a member of the clutch device.

2. The combination with a hose reel; of a hose having one end connected to said reel; a spring for turning said reel in one direction to wind the hose thereon; clutch means for detachably detaining said reel with the hose in a position to which it may be withdrawn; said clutch means being releasable by tension upon the hose; a casing for the reel and its appurtenances; a pair of brake levers pivotally connected with said reel and having brake shoes adapted to frictionally engage said casing when the movement of said reel exceeds a predetermined speed; two clutch pawls respectively pivoted on said brake levers; and a stationary clutch plate, carried by said casing, in cooperative relation with said pawls; said plate carrying a pawl stop member and a pawl tripping member.

3. The combination with a hose reel; of a hose having one end connected to said reel; a spring for turning said reel in one direction to wind the hose thereon; a casing for said reel, including a section rotatably adjustable on the axis of said reel, and having a hose outlet housing; whereby said hose outlet may be moved to facilitate the withdrawal of the hose from said reel in different directions; a removable cover for said adjustable casing section; a clutch plate carried by said cover; and a movable clutch member carried by said reel for cooperation with said stationary clutch member; whereby said hose may be withdrawn through said casing and automatically returned upon said reel when released, and be selectively detained, in different withdrawn positions, by engagement with said clutch device; said clutch device being operable by variable tension on the hose to hold the hose in any desired position and release it.

4. The combination with a hose reel; of a hose having one end connected to said reel; a spring for turning said reel in one direction to wind the hose thereon; clutch means for detachably detaining said reel with the hose in a position to which it may be withdrawn; said clutch means being releasable by tension upon the hose; and a centrifugally operative brake lever, carried by said reel, and pivotally connected with said clutch means, for preventing turning movement of said reel in excess of a predetermined speed when said clutch means is released.

5. The combination with a hose reel; of a hose having one end connected to said reel; a spring for turning said reel in one direction to wind the hose thereon; centrifugally operative clutch means for detachably detaining said reel with the hose in a position to which it may be withdrawn; said clutch means including a latch releasable by tension upon the hose; and centrifugally operative brake means, pivotally connected with said latch, for releasing said clutch means and limiting the speed of movement of said reel by said spring when said clutch means is released.

GILES V. BARR.